Dec. 30, 1930. J. E. SHAFER 1,787,214
ANTIFRICTION BEARING
Filed Jan. 16, 1928
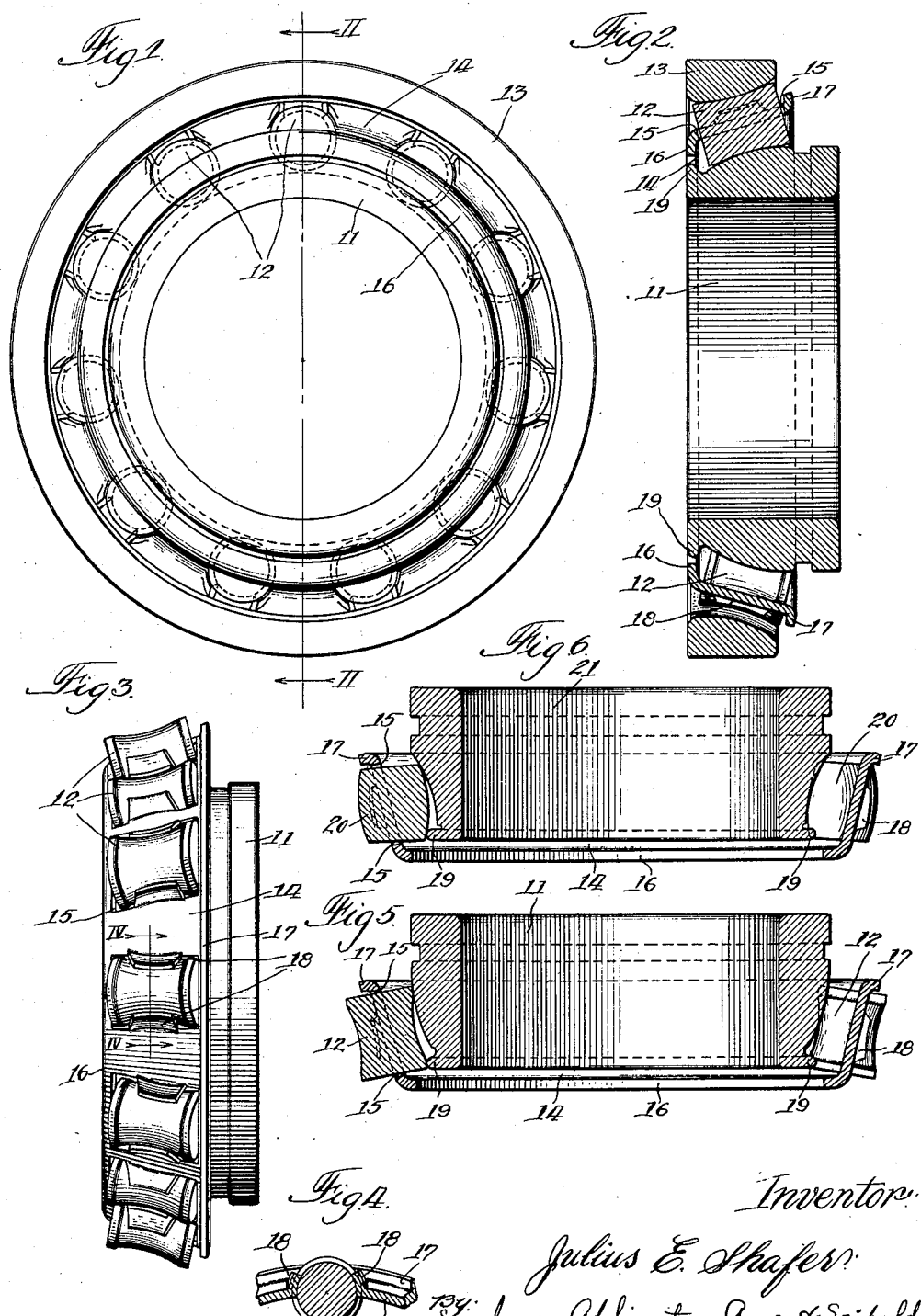
Inventor:
Julius E. Shafer
By Jones, Addington, Ames & Seibold
Attys.

Patented Dec. 30, 1930

1,787,214

UNITED STATES PATENT OFFICE

JULIUS E. SHAFER, OF CHICAGO, ILLINOIS, ASSIGNOR TO SHAFER BEARING CORPORATION, OF CHICAGO, ILLINOIS, A CORPORATION OF ILLINOIS

ANTIFRICTION BEARING

Application filed January 16, 1928. Serial No. 246,927.

My invention relates to antifriction bearings and has particular relation to that class of bearings which utilizes inner and outer races and cooperating rollers therebetween.

United States Patent No. 1,551,334, granted to me on August 25, 1925, shows a roller bearing comprising an inner race member having a bearing surface constituting a segment of a sphere, a plurality of concave bearing rollers conforming to the surface of the inner race member, and an outer race member having a curved inner surface conforming to the shape of the rollers. The disclosure of this patent also includes several forms of retaining members for maintaining the bearing rollers in proper operative positions in the assembled structure.

The present invention contemplates certain improvements in the structure shown in my above-mentioned patent, as well as in other types of bearings, and, particularly, in the retaining member and inner race member of such bearings. These improvements are embodied in the structure without sacrificing any of the advantages inherent therein.

One object of my invention is to provide an improved form of retaining member for a bearing of the above-indicated character, the construction of which is simpler and more economical than is that of the forms previously used. This improved form of retaining member is also designed to be more durable in operation and less subject to the necessity for replacement by reason of wear.

Another object of my invention is to provide a bearing of the above-indicated character that may be assembled and handled with greater ease and speed than could the devices heretofore used.

Further objects and advantages of my invention will appear upon reference to the following detailed description, together with the accompanying drawings, in which:

Figure 1 is an end elevational view of an assembled bearing embodying my invention and utilizing concave bearing rollers;

Fig. 2 is a sectional view taken along the line II—II of Fig. 1;

Fig. 3 is a side elevational view of the rollers, retaining member, and inner race member of the bearing embodying my invention, shown in assembled relation;

Fig. 4 is a fragmentary sectional view taken along the line IV—IV of Fig. 3;

Fig. 5 is a diametrical sectional view of the rollers, retaining member, and inner race member of the bearing, showing the manner in which the same may be assembled; and Fig. 6 is a view similar to Fig. 5, but showing the application of my invention to a bearing utilizing convex bearing rollers.

Referring to Figs. 1 to 5 of the drawings, the bearing comprises, in the particular embodiment illustrated, an inner race member 11 of annular form, the outer surface of which constitutes a segment of a sphere determined by two parallel planes. It will be observed that this bearing surface is of progressively increasing diameter, proceeding from one end thereof to the other.

A plurality of bearing rollers 12 are disposed in operative relation with respect to the bearing surface of the inner race member 11, the bearing surfaces of these rollers substantially conforming to the shape of the inner race member. An annular outer race member 13 surrounds the bearing rollers 12 and has an inner bearing surface curved substantially to conform to the shape of the rollers. In other words, this surface is complementary to the bearing surface of the inner race member 11.

The rollers 12 are maintained in relatively spaced positions and in proper operating position with respect to the race members by an annular retaining member 14. The member 14 is of substantially frusto-conical shape, and has apertures 15 therein within which the bearing rollers 12 are disposed. The retaining member 14 is strengthened by annular flanges 16 and 17, the former being turned inwardly at that end of the member having the smaller diameter, and the latter being turned outwardly at the opposite end of the member.

At each side of the apertures 15 in the retaining member 14, integral lip portions 18 are struck outwardly and bent to conform to the bearing surfaces of the rollers 12, such conformation being most clearly illustrated in Figs. 3 and 4. The retaining member 14 is made of such material that these lip portions are slightly resilient, this characteristic being utilized for a purpose hereinafter described.

Since the lip portions 18 conform to the shape of the rollers 12, and since the rollers are disposed in close proximity to the lip portions when the bearing is assembled, the rollers and the retaining member are constantly maintained in centered relation. This centering action is secured without contact between the ends of the bearing rollers and the adjacent ends of the apertures 15 in the retaining member 14, said apertures extending beyond each end of the rollers a sufficient distance to permit the action described.

Thus, all wear on the retaining member at the ends thereof is eliminated, and the only friction between the retaining member and the rollers occurs by reason of the contact between the lips 18 and the bearing surfaces of the rollers. These surfaces are constantly lubricated during the normal operation of the bearing, and, therefore, the resultant wear on either the rollers or the lip portions of the retaining member is negligible. This wear is further minimized by reason of the fact that the area of contact between the lip portions 18 and the bearing rollers is relatively large. This condition will be apparent upon reference to Figs. 3 and 4 of the drawings.

A further feature of my invention lies in the provision of an annular shoulder portion 19 at the reduced diameter end of the inner race member 11. The outside diameter of this shoulder portion is slightly greater than that of the circle inscribed between the inner edges of the bearing rollers when the latter are in contact with the lip portions 18 of the retaining member 14. This construction greatly facilitates the assembly of the bearing embodying my invention.

Such assembly is accomplished, as partly illustrated in Fig. 5 of the drawings, by placing the retaining member 14 in a horizontal position and then placing the rollers 12 in the respective apertures 15 in said retaining member. The rollers will be stable in this position because they are tilted outwardly from the bottom and are supported on their outer surfaces by the lip portions 18. The inner race member 11 is then inserted from the top, but since the shoulder portion is of greater diameter than the space between the lower edges of the rollers, it becomes necessary to apply sufficient force to the race member 11 in a downward direction to spring the rollers outwardly. Such movement is possible because, as already stated, the lip portions 18 are slightly resilient.

Fig. 5 shows the relative positions of the elements when the inner race member has been forced downwardly to the position in which the lower and inner edges of the rollers are in contact with the outermost diameter of the shoulder portion 19. Further downward movement of the race member 11 causes the shoulder 19 to clear the lower ends of the rollers, whereupon the race member snaps into normal position with respect to the rollers and the retaining member. In reference to this method of assembling the bearing, it will be observed that the edges of the rollers 12 and of the shoulder portion 19 are sufficiently rounded to permit the described operation without injury to any of the parts.

When the inner race member, rollers and retaining member have been assembled in the manner described, the shoulder portion 19 is effective to prevent disassembly thereof, since any attempt to force the parts out of assembled relation will result in the binding of the ends of the rollers against the shoulder portion 19. The inner race member, rollers and retaining member, when once assembled, therefore, constitute a unitary element that may be handled with great ease in assembling the same with the outer race member.

Fig. 6 shows the manner of assembling another form of bearing embodying my invention. The bearing shown in this view is similar to that shown in the other figures, but utilizes a plurality of rollers 20 having convex bearing surfaces, cooperating with a concave-surfaced inner race member 21 and an outer race member (not shown) having a complementarily concaved bearing surface. The inner race member 21 comprises the annular shoulder portion 19 of the same form utilized in the bearing shown in the other figures, and the retaining member 14 is similarly provided with the apertures 15, the flanges 16 and 17, and the lip portions 18 conforming to the contour of the bearing rollers. The method of assembly of this form of bearing is precisely the same as that of the form hereinbefore described in detail, and the difference in construction of the two forms is not sufficient to require more detailed illustration or description.

While I have shown and described only certain specific embodiments of my invention, it will be apparent to those skilled in the art that various changes and modifications may be made in the details of construction without departing from the spirit and scope of my invention, as set forth in the appended claims.

I claim as my invention:

1. An antifriction bearing comprising a plurality of bearing rollers and means contactive with said rollers only on the bearing surfaces thereof for retaining the same in position.

2. An antifriction bearing comprising a plurality of bearing rollers and resilient means contactive with said rollers only on the bearing surfaces thereof for retaining the same in position.

3. An antifriction bearing comprising a plurality of bearing rollers and a retaining member therefor having resilient projecting portions contactive with said rollers only on the bearing surfaces thereof and solely effective to maintain said rollers in operative position.

4. An antifriction bearing comprising a plurality of rollers having concave bearing surfaces and means contactive only with the concave surfaces of said rollers for retaining the same in position.

5. An antifriction bearing comprising a plurality of rollers having concave bearing surfaces and means contactive only with the concave surfaces of said rollers for retaining the same against endwise displacement.

6. An antifriction bearing comprising a plurality of rollers having concave bearing surfaces and a retaining member having a plurality of apertures therein individually adapted to receive said rollers, said retaining member being provided with lip portions conforming to the concave surfaces of said rollers and contactive with said surfaces to prevent contact between the ends of said rollers and the retaining member.

7. An antifriction bearing comprising a plurality of rollers having concave bearing surfaces and a retaining member having a plurality of apertures therein individually adapted to receive said rollers, said retaining member being provided with integral lip portions conforming to the concave surfaces of said rollers and contactive with said surfaces to prevent contact between the ends of said rollers and the retaining member.

8. An antifriction bearing comprising a plurality of rollers having concave bearing surfaces and a retaining member having a plurality of apertures therein individually adapted to receive said rollers, said retaining member being provided with resilient lip portions conforming to the concave surfaces of said rollers and contactive with said surfaces to prevent contact between the ends of said rollers and the retaining member.

9. An antifriction bearing comprising a plurality of rollers having concave bearing surfaces and a retaining member having a plurality of apertures therein individually adapted to receive said rollers, said retaining member being provided with integral resilient lip portions conforming to the concave surfaces of said rollers and contactive with said surfaces to prevent contact between the ends of said rollers and the retaining member.

10. An antifriction bearing comprising a plurality of rollers having concave bearing surfaces and a substantially frusto-conical retaining member having a plurality of apertures therein individually adapted to receive said rollers, said retaining member being provided with integral resilient lip portions conforming to the concave surfaces of said rollers and contactive with said surfaces to prevent contact between the ends of said rollers and the retaining member.

11. An antifriction bearing comprising an inner race member, an outer race member, a plurality of bearing rollers disposed between said race members in axially inclined relation thereto, and a retaining member for maintaining said rollers in operative positions, said inner race member comprising an annular projecting shoulder and said retaining member comprising resilient portions adapted to permit displacement of said rollers from their normal positions to facilitate assembly of the bearing.

12. An antifriction bearing comprising an inner race member, an outer race member, a plurality of bearing rollers disposed between said race members in axially inclined relation thereto, and a retaining member for maintaining said rollers in operative positions, said inner race member comprising an integral annular shoulder portion projecting therefrom and said retaining member comprising resilient portions adapted to permit displacement of said rollers from their normal positions to facilitate assembly of the bearing.

13. A unitary bearing element comprising a plurality of bearing rollers, an integral retaining member having resilient portions adapted to contact with said rollers, and a race member having an integral projecting portion for maintaining the element in assembled relation and over which the rollers are sprung against the action of the said resilient portions to seat them in operative position.

14. A unitary bearing element comprising a plurality of bearing rollers, an integral retaining member having resilient portions adapted normally to retain said rollers against displacement in any direction and a race member having an integral projecting portion adapted to cause displacement of said rollers against the spring action of said resilient portions when the element is being assembled and thereafter to prevent disassembly of the element by coaction with the ends of said rollers.

15. A unitary bearing element comprising a plurality of rollers having concave bearing surfaces, an integral retaining member having resilient portions conforming to said concave bearing surfaces and adapted normally to retain said rollers against displacement in any direction, and a race member having an integral projecting portion adapted to cause displacement of said rollers against the spring action of said resilient portions when the element is being assembled and thereafter to prevent disassembly of the element by coaction with the ends of said rollers.

16. A self-aligning antifriction bearing comprising a plurality of rollers having concave bearing surfaces, a retaining member therefor having portions conforming to said concave bearing surfaces and adapted normally to retain said rollers against displacement, and inner and outer race members cooperating with said rollers, said inner race member having a bearing surface of substantially spherical formation and having a portion so disposed as to prevent the disassembly of said rollers, retaining member and inner race member after these elements have been assembled in their normal relative positions, but to permit sufficient tilting of said rollers and retaining member with respect to said inner race member to accommodate any ordinary degree of misalignment of the axes of said inner and outer race members.

17. A self-aligning antifriction bearing comprising a plurality of rollers having concave bearing surfaces, a retaining member therefor having portions conforming to said concave bearing surfaces and adapted normally to retain said rollers against displacement with their axes inclined with respect to the normal axis of the bearing, and inner and outer race members cooperating with said rollers, said inner race member having a bearing surface of substantially spherical formation and of progressively increasing diameter from one end to the other end thereof and having a portion adjacent the end of the bearing surface of smallest diameter to prevent the disassembly of said rollers, retaining member and inner race member after these elements have been assembled in their normal relative positions, but to permit sufficient tilting of said rollers and retaining member with respect to said inner race member to accommodate any ordinary degree of misalignment of the axes of said inner and outer race members.

In witness whereof, I have hereunto subscribed my name.

JULIUS E. SHAFER.